(12) United States Patent
Arnao et al.

(10) Patent No.: US 12,309,567 B2
(45) Date of Patent: May 20, 2025

(54) MULTI-TRACK AUDIO IN A SECURITY SYSTEM

(71) Applicant: The ADT Security Corporation, Boca Raton, FL (US)

(72) Inventors: Michael A. Arnao, Collegeville, PA (US); Maurice J. Buttimer, Newtown Square, PA (US); Andrew P. Weir, Malvern, PA (US)

(73) Assignee: The ADT Security Corporation, Boca Raton, FL (US)

( * ) Notice: Subject to any disclaimer, the term of this patent is extended or adjusted under 35 U.S.C. 154(b) by 136 days.

(21) Appl. No.: 17/885,914

(22) Filed: Aug. 11, 2022

(65) Prior Publication Data

US 2023/0049433 A1 Feb. 16, 2023

Related U.S. Application Data

(60) Provisional application No. 63/231,951, filed on Aug. 11, 2021.

(51) Int. Cl.
*H04S 3/00* (2006.01)
*G06F 16/683* (2019.01)
*H04S 1/00* (2006.01)
*H04S 7/00* (2006.01)

(52) U.S. Cl.
CPC ............ *H04S 3/008* (2013.01); *G06F 16/683* (2019.01); *H04S 1/007* (2013.01); *H04S 7/30* (2013.01); *H04S 2400/01* (2013.01); *H04S 2400/11* (2013.01); *H04S 2400/15* (2013.01)

(58) Field of Classification Search
CPC .......................... H04S 2400/15; H04S 2400/11
See application file for complete search history.

(56) References Cited

U.S. PATENT DOCUMENTS

| | | | | |
|---|---|---|---|---|
| 2008/0144794 A1* | 6/2008 | Gardner | ................ | H04M 3/568 |
| | | | | 379/202.01 |
| 2008/0260131 A1* | 10/2008 | Akesson | ............... | H04M 3/568 |
| | | | | 379/202.01 |
| 2011/0002469 A1* | 1/2011 | Ojala | ........................ | H04S 7/30 |
| | | | | 381/23 |
| 2014/0012907 A1* | 1/2014 | Cavanaugh | ............. | G06F 3/165 |
| | | | | 709/204 |
| 2015/0296086 A1* | 10/2015 | Eckert | ....................... | H04S 5/00 |
| | | | | 381/17 |
| 2021/0295820 A1* | 9/2021 | Hirvonen | .................. | H04S 7/30 |

* cited by examiner

*Primary Examiner* — Ping Lee
(74) *Attorney, Agent, or Firm* — Weisberg I.P. Law, P.A.

(57) ABSTRACT

A method, system, server and device are disclosed. According to one or more embodiments, a server is provided. A first audio track is received which includes first audio originating from a premises client at a premises location. A second audio track is received which includes second audio originating from a remote client. A first pan angle is determined for the first audio track and a second pan angle is determined for the second audio track. The second pan angle is different from the first pan angle. A stereo composite track is generated based on the first pan angle and the second pan angle, where the stereo composite track includes the first audio track and the second audio track.

20 Claims, 6 Drawing Sheets

MULTI-TRACK AUDIO IN A SECURITY SYSTEM

CROSS-REFERENCE TO RELATED PATENT APPLICATION

This application is related to and claims priority to U.S. Provisional Patent Application Ser. No. 63/231,951, filed Aug. 11, 2021, entitled METHOD FOR MULTI-TRACK AUDIO IN A SECURITY SYSTEM, the entirety of which is incorporated herein by reference.

TECHNICAL FIELD

The present invention relates to wireless communications, and in particular, to multi-track audio in a premises security system.

BACKGROUND

A security system such as a premises security system is typically used to monitor the premises using one or more devices. For example, the premises security system may include a device such as a camera that is provided with a microphone and speaker to enable two-way or multi-way talk between a client at the camera location and one or more clients at remote locations. In one example, the clients at different locations may communicate with each other using a software application that accesses the microphone and speaker of the client's mobile device or personal computer, transmitting audio to the camera and receiving audio from the camera via a wired or wireless connection.

One feature of such cameras or security systems is the ability to record an audio track containing a mix of camera audio and remote audio. In particular, existing systems combine all audio tracks associated with the client at the camera location and the one or more clients at the remote locations into a single track in which each source is panned center. On playback of the composite mix, it may be difficult to attribute any captured dialogue to a particular client, and there could be overlap or obfuscation of dialogue or other sounds that may be important such as during an emergency situation.

SUMMARY

Some embodiments advantageously provide methods, systems, and apparatuses for multi-track audio in a premises security system.

One or more embodiments described herein address problems with existing security systems by creating a stereo composite track in which each source is automatically panned to a distinct location to enhance the differentiation of sources on playback. Further, in one or more embodiments, a separate "forensic" audio track is created for at least one individual source. The creation of the stereo composite track and/or forensic audio track may be in addition to the audio track including a mix of all sources.

According to one aspect of the present invention, a server is provided. The server includes processing circuitry configured to receive a first audio track including first audio originating from a premises client at a premises location, receive a second audio track including second audio originating from a remote client, and generate a stereo composite track including the first audio and second audio where the first audio is configured with a first pan angle and the second audio is configured with a second pan angle different from the first pan angle.

According to one or more embodiments, the processing circuitry is further configured to generate a respective forensic audio track for the first audio track and the second audio track where each forensic file includes metadata associated with the respective client (e.g., client application). According to one or more embodiments, the first audio track is associated with a premises camera, including a microphone and speaker, and the second audio track is associated with a mobile device. According to one or more embodiments, the first pan angle associated with the first audio track is equal to a center pan angle.

According to one or more embodiments, the processing circuitry is further configured to receive a plurality of audio tracks including a plurality of audio originating from a plurality of remote clients where the plurality of audio tracks includes the second audio track, as described herein. The generated stereo composite track includes the plurality of audio tracks where each of the plurality of audio tracks is configured with a different pan angle from each other, as described herein. According to one or more embodiments, the pan angles for the plurality of audio tracks correspond to an interval that is based at least on a total quantity of clients. According to one or more embodiments, the processing circuitry is configured to modify a pan angle for at least one of the plurality of audio tracks based at least an addition or removal of a client from the stereo composite track. According to one or more embodiments, the processing circuitry is configured to maintain pan angles for a remaining plurality of audio tracks in response to the removal of a client from the stereo composite track. According to one or more embodiments of this aspect, the processing circuitry is further configured to cause transmission of the stereo composite track for playback.

According to another aspect of the present invention, a method is provided. A first audio track including first audio originating from a premises client at a premises location is received. A second audio track including second audio originating from a remote client is received. A stereo composite track is generated that including the first audio and second audio where the first audio is configured with a first pan angle and the second audio is configured with a second pan angle different from the first pan angle.

According to one or more embodiments of this aspect, a respective forensic audio track for the first audio track and the second audio track is generated where each forensic file includes metadata associated with the respective client. According to one or more embodiments of this aspect, the first audio track is associated with a premises camera including a microphone and speaker, and the second audio track is associated with a mobile device. According to one or more embodiments of this aspect, the first pan angle associated with the first audio track is equal to a center pan angle.

According to one or more embodiments of this aspect, receiving a plurality of audio tracks including a plurality of audio originating from a plurality of remote clients is received where the plurality of audio tracks includes the second audio track, and the generated stereo composite track includes the plurality of audio tracks where each of the plurality of audio tracks is configured with a different pan angle from each other. According to one or more embodiments of this aspect, the pan angles for the plurality of audio tracks correspond to an interval that is based at least on a total quantity of clients. According to one or more embodiments of this aspect, a pan angle for at least one of the plurality of audio tracks is modified based at least an addition or removal of a client from the stereo composite track. According to one or more embodiments of this aspect, pan angles are maintained for a remaining plurality of audio tracks in response to the removal of a client from the stereo composite track. According to one or more embodiments of this aspect, transmission is caused of the stereo composite track for playback.

According to another aspect of the present invention, a device configured to communicate with a server is provided. The device includes processing circuitry configured to: generate a first audio track including first audio associated with a first client, cause transmission of the first audio track, and receive a stereo composite track for playback where the stereo composite track includes the first audio and a second audio track includes second audio associated with a second client, and where the first audio is configured with first pan angle and the second audio is configured with a second pan angle different from the first pan angle.

According to one or more embodiments of this aspect, the first client is a premises client at a premises location and the second client is a remote client, as described herein. According to one or more embodiments of this aspect, the device is a premises camera including a microphone and speaker, and the second audio track is associated with a mobile device, as described herein. According to one or more embodiments of this aspect, the first pan angle associated with the first audio track is equal to a center pan angle, as described herein.

According to one or more embodiments of this aspect, the stereo composite track includes a plurality of audio tracks including a plurality of audio originating from a plurality of remote clients where the plurality of audio tracks includes the second audio track, and each of the plurality of audio tracks is configured with a different pan angle from each other, as described herein. According to one or more embodiments of this aspect, the pan angles for the plurality of audio tracks corresponds to an interval that is based at least on a total quantity of clients, as described herein. According to one or more embodiments of this aspect, the first client is a remote client and the second client is a premises client (e.g., client application) at a premises location, as described herein.

According to another aspect of the present invention, a method implemented by a device that is configured to communicate with a server is provided. A first audio track including first audio associated with a first client is generated. Transmission is caused of the first audio track. A stereo composite track for playback is received where the stereo composite track includes the first audio and a second audio track includes second audio associated with a second client, and where the first audio is configured with first pan angle and the second audio is configured with a second pan angle different from the first pan angle.

According to one or more embodiments of this aspect, the first client is a premises client at a premises location and the second client is a remote client. According to one or more embodiments of this aspect, the method is implemented by a premises camera that includes a microphone and speaker, and where the second audio track is associated with a mobile device. According to one or more embodiments of this aspect, the first pan angle associated with the first audio track is equal to a center pan angle.

According to one or more embodiments of this aspect, the stereo composite track includes a plurality of audio tracks including a plurality of audio originating from a plurality of remote clients where the plurality of audio tracks includes the second audio track, and each of the plurality of audio tracks is configured with a different pan angle from each other. According to one or more embodiments of this aspect, the pan angles for the plurality of audio tracks corresponds to an interval that is based at least on a total quantity of clients. According to one or more embodiments of this aspect, the first client is a remote client and the second client is a premises client at a premises location.

According to one aspect of the present invention, a server is provided. The server includes processing circuitry configured to receive a first audio track including first audio originating from a premises client at a premises location. The processing circuitry is further configured to receive a second audio track including second audio originating from a remote client. The processing circuitry is further configured to determine a first pan angle for the first audio track and a second pan angle for the second audio track, where the second pan angle is different from the first pan angle. The processing circuitry is further configured to generate a stereo composite track based on the first pan angle and the second pan angle, where the stereo composite track includes the first audio track and the second audio track.

According to one or more embodiments of this aspect, the generating of the stereo composite track includes generating at least one of a first forensic audio file associated with the first audio track including metadata associated with the premises client and a second forensic audio file associated with the second audio track including metadata associated with the remote client. According to one or more embodiments of this aspect, the processing circuitry is further configured to receive a plurality of audio tracks including a plurality of audio originating from a plurality of remote clients, where the plurality of audio tracks includes the second audio track. The processing circuitry is further configured to determine, for each of the plurality of audio tracks, a respective pan angle, where each respective pan angle is distinct from the other respective pan angles. The generating of the stereo composite track is further based on the respective pan angles, and the stereo composite track includes the plurality of audio tracks. According to one or more embodiments of this aspect, the determining of the respective pan angles includes determining, for each respective pan angle, a corresponding interval based on a quantity of clients associated with the plurality of audio tracks of the generated stereo composite track. According to one or more embodiments of this aspect, the processing circuitry is further configured to remove an audio track from the stereo composite track, where the removed audio track is associated with a removed client. The processing circuitry is further configured to either modify at least one respective pan angle in response to the removing, or to maintain the respective pan angles in response to the removing. According to one or more embodiments of this aspect, the processing circuitry is further configured to add an audio track to the stereo composite track, where the added audio track is associated with an added client, and either to modify at least one respective pan angle in response to the adding or to maintain the respective pan angles in response to the adding.

According to another aspect of the present invention, a method implemented in a server is provided. A first audio track is received which includes first audio originating from a premises client at a premises location. A second audio track is received which includes second audio originating from a remote client. A first pan angle is determined for the first audio track and a second pan angle is determined for the second audio track. The second pan angle is different from the first pan angle. A stereo composite track is generated based on the first pan angle and the second pan angle. The stereo composite track includes the first audio track and the second audio track.

According to one or more embodiments of this aspect, the generating of the stereo composite track includes generating at least one of a first forensic audio file associated with the first audio track including metadata associated with the premises client and a second forensic audio file associated with the second audio track including metadata associated with the remote client. According to one or more embodiments of this aspect, a plurality of audio tracks is received which include a plurality of audio originating from a plurality of remote clients, where the plurality of audio tracks includes the second audio track. For each of the plurality of audio tracks, a respective pan angle is determined, where each respective pan angle is distinct from the other respective pan angles. The generating of the stereo composite track is further based on the respective pan angles, and the stereo composite track includes the plurality of audio tracks. According to one or more embodiments of this aspect, the determining of the respective pan angles includes determining, for each respective pan angle, a corresponding interval based on a quantity of clients associated with the plurality of audio tracks of the generated stereo composite track. According to one or more embodiments of this aspect, an audio track is removed from the stereo composite track, where the removed audio track is associated with a removed client. At least one respective pan angle is modified in response to the removing, or the respective pan angles are maintained in response to the removing. According to one or more embodiments of this aspect, an audio track is added to the stereo composite track, where the added audio track is associated with an added client. At least one respective pan angle is modified in response to the adding, or the respective pan angles are maintained in response to the adding.

According to one aspect of the present invention, a device in communication with a server is provided. The device includes processing circuitry configured to generate a first audio track including first audio associated with a premises client. The processing circuitry is further configured to cause transmission of the first audio track to the server. The processing circuitry is further configured to receive, from the server, a stereo composite track for playback, where the stereo composite track includes the first audio track and a second audio track including second audio originating from a remote client. The first audio track is associated with a first pan angle, and the second audio track is associated with a second pan angle different from the first pan angle.

According to one or more embodiments of this aspect, the stereo composite track further includes at least one of a first forensic audio file associated with the first audio track including metadata associated with the premises client and a second forensic audio associated with the second audio track including metadata associated with the remote client. According to one or more embodiments of this aspect, the stereo composite track further includes a plurality of audio tracks including a plurality of audio originating from a plurality of remote clients, where each of the plurality of audio tracks is associated with a respective pan angle, and each respective pan angle is distinct from the other respective pan angles. The plurality of audio tracks includes the second audio track. According to one or more embodiments of this aspect, each respective pan angle corresponds to an interval that is determined based on a total quantity of clients associated with the generated stereo composite track.

According to another aspect of the present invention, a method implemented in a device in communication with a server is provided. A first audio track is generated including first audio associated with a premises client. The first audio track is transmitted to the server. A stereo composite track for playback is received from the server, where the stereo composite track includes the first audio track and a second audio track including second audio originating from a remote client. The first audio track is associated with a first pan angle, the second audio track is associated with a second pan angle different from the first pan angle.

According to one or more embodiments of this aspect, the stereo composite track further includes at least one of a first forensic audio file associated with the first audio track including metadata associated with the premises client and a second forensic audio associated with the second audio track including metadata associated with the remote client. According to one or more embodiments of this aspect, the stereo composite track further includes a plurality of audio tracks including a plurality of audio originating from a plurality of remote clients, where each of the plurality of audio tracks is associated with a respective pan angle, and each respective pan angle is distinct from the other respective pan angles. The plurality of audio tracks includes the second audio track. According to one or more embodiments of this aspect, each respective pan angle corresponds to an interval that is determined based on a total quantity of clients associated with the generated stereo composite track.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
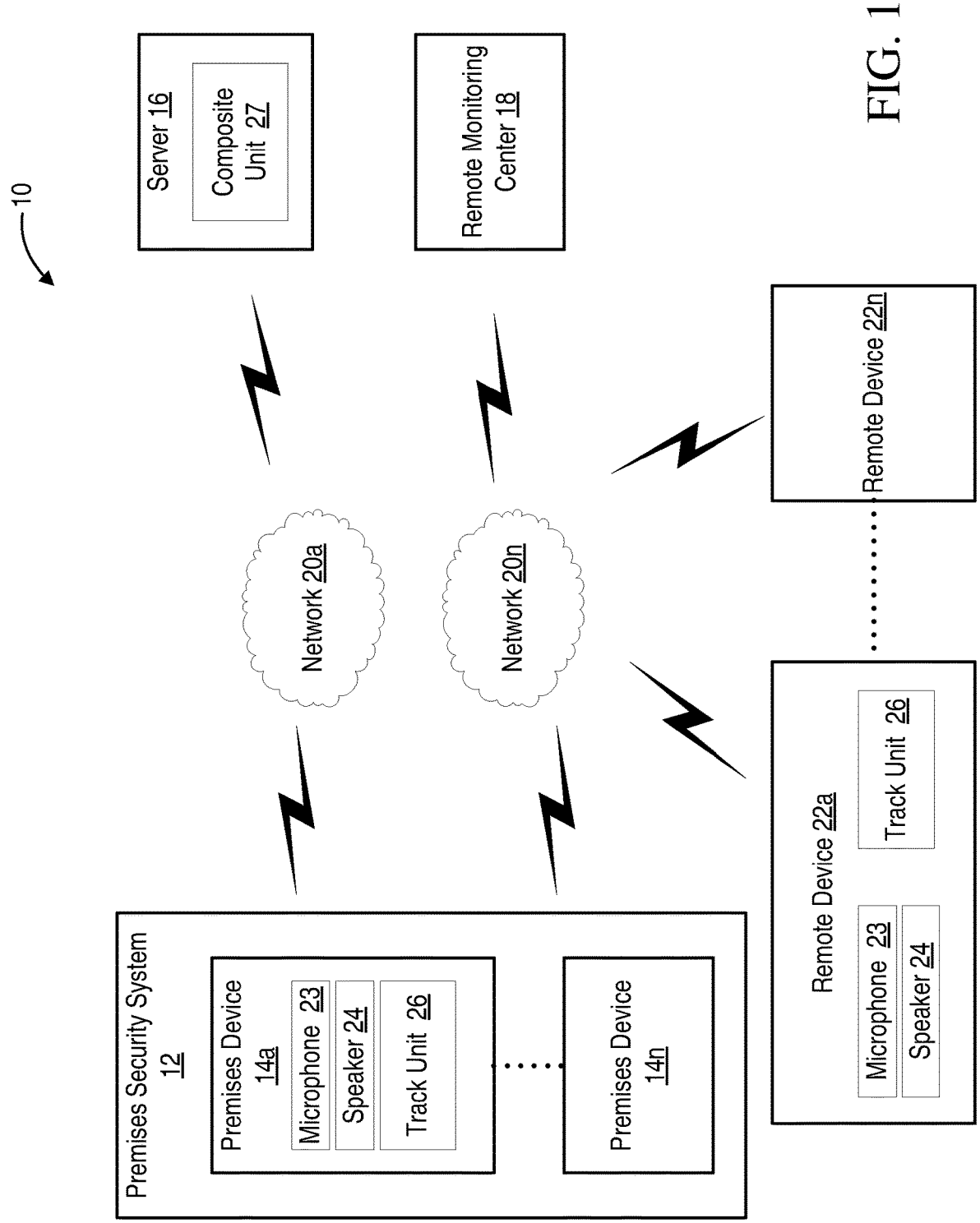
FIG. 1 is a schematic diagram of an example system architecture according to the principles in the present invention.

Existing security systems such as premises security systems do not attempt to isolate the audio originating at the camera's microphone at the client location from the audio originating at the one or more remote microphone(s) at one or more remote locations. That is, existing systems combine all audio originating at the client location and at each remote location into a single track, in which each source is panned center. This approach suffers from various issues described above.

One or more embodiments described herein addresses the problems with existing security systems by creating a stereo composite track in which each source is panned automatically to a distinct location to enhance the differentiation of sources on playback. Further, in one or more embodiments, a separate "forensic" audio track is created for at least one individual source. The creation of the stereo composite track and/or forensic audio track may be in addition to the audio track including a mix of all sources.

For example, in one scenario: user device A and user device B, in remote locations, concurrently access the audio and video streams of a premises camera, C, in a real-time streaming session. User device A receives an audio mix of user device B and camera C. User device B receives an audio mix of user device A and camera C. Camera C receives an audio mix of user device A and user device B. The connections among the participants are established through a relay server Rs such that participants connect to server R instead of directly to each other, and server R routes the audio and video data among user device A, user device B, and camera C. Additionally, server R records the audio and video streams into a file to be stored in the cloud for later review. The file includes a video track, a stereo composite audio track containing a mix of audio from each participant panned to a distinct location (e.g., A panned left, C panned center, B panned right), and for each participant an additional audio track ("forensic track") containing only the audio contribution of that participant is generated. Associated with each track is metadata (Internet Protocol (IP) address, Media Access Control (MAC) address, pan angle, etc.) corresponding to each contributor to the track.

Before describing in detail example embodiments, it is noted that the embodiments reside primarily in combinations of apparatus components and processing steps related to multi-track audio in a premises security system. Accordingly, components have been represented where appropriate by conventional symbols in the drawings, showing only those specific details that are pertinent to understanding the embodiments so as not to obscure the invention with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting term "remote device" can be any type of wireless device capable of communicating with a premises device, server, etc. The remote device may be a cellular phone, radio communication device, Tablet, mobile terminals, smart phone, laptop embedded equipped (LEE), laptop mounted equipment (LME), an Internet of Things (IoT) device, etc.

In some embodiments, the non-limiting term "client" may refer to one or more devices, such as a premises device or remote device, may refer to a software program (e.g., client application) running on such device. For example, the term "premises client" may refer to a premises device, may refer to a software program running on a premises device, which may interface/interact with users located, e.g., at a premises site. As another example, the term "remote client" may refer to a remote device, may refer to a software program running on a remote device, which may interface/interact with users located, e.g., at a remote site.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide multi-track audio in a premises security system.

Referring now to the drawing figures, in which like elements are referred to by like reference numerals, there is shown in FIG. 1 a schematic diagram of a system 10 according to the present invention. System 10 includes a premises security system 12 including one or more premises devices 14*a*-14*n* (one or more of which may be referred to as premises device 14). Premises devices 14 may include one or more types of sensors, control devices and/or image capture devices. For example, the types of sensors may include one or more of motion sensors, fire sensors, carbon monoxide sensors, flooding sensors and contact sensors, among other sensor types that are known in the art.

The control devices may include, for example, one or more devices configured to adjust at least one premises setting such as lighting, temperature, energy usage, door lock and power settings, among other settings associated with the premises or devices on the premises. Image capture devices may include a digital camera, video camera, doorbell camera among other image captures devices where the camera may include a microphone for recording audio and a speaker. Premises device 14 may communicate with server 16 and/or remote monitoring center 18 via network 20. In one or more embodiments, communications to/from premises devices 14 may pass through a control unit (not shown) via proprietary wireless communication protocols and/or other wireless communication protocols known in the art. In particular, the control unit may provide management functions such as power management, premises device management and alarm management, among other functions.

Server 16 is configured to perform one or more server 16 functions described herein where server 16 may be co-located with or be part of the remote monitoring center. Remote monitoring center 18 may be capable of performing certain monitoring, configuration and/or control functions associated with premises security system 12. For example, with respect to fire and carbon monoxide detectors/sensors, monitoring data may include at least one carbon monoxide readings, smoke detection reading, sensor location and time of reading, among other related to these detectors that may be communicated with remote monitoring center 18. In yet another example, with respect to a door contact detector, monitoring data may include at least one of sensor location and time of detection, among other data related to the door contact detection that may be communicated with remote monitoring center 18.

Alarm event data from the premises devices 14 may be used by the remote monitoring center 18 in running through various safety response processes, e.g., in notifying the owner of the premises, determining whether an actual alarm event is occurring at the premises, and notifying any appropriate response agency (e.g., police, fire, emergency response, other interested parties such as premises owners, etc.).

Further, system 10 includes one or more remote devices 22a-22n (one or more of which may be referred to as remote device 22).

Remote device 22 and/or premises device 14 may include a microphone 23 and speaker 24 that are configured to, e.g., generate an audio track, receive a stereo composite track for playback, and perform other functions described herein.

A premises device 14 is configured to include a track unit 26 which is configured to perform one or more audio track related functions described herein such as with respect to multi-track audio in a premises security system. In one or more embodiments, remote device 22 is also configured with track unit 26. Server 16 is configured with composite unit 27 that is configured to perform one or more audio track related functions as described herein such as with respect to multi-track audio in a premises security system.

Example implementations, in accordance with one or more embodiments of premises device 14, remote device 22 and server 16 discussed in the preceding paragraphs, will now be described with reference to FIG. 2. In system 10, server 16 includes hardware 28 enabling it to communicate with one or more entities in system 10. The hardware 28 may include a communication interface 30 for setting up and maintaining a wired or wireless connection with one or more entities in system 10 such as with premises device 14 and remote device 22, etc. In one or more embodiments, communication interface 30 includes, for example, one or more RF transmitters, one or more RF receivers, and/or one or more RF transceivers.

In the embodiment shown, the hardware 28 of the server 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, server 16 further has software 40 stored internally in, for example, memory 38, or stored in external memory (e.g., database, storage array, network storage device, etc.) accessible by server 16 via an external connection. The software 40 may be executable by the processing circuitry 34. The processing circuitry 34 may be configured to control any of the methods and/or processes described herein and/or to cause such methods, and/or processes to be performed, e.g., by server 16. Processor 36 corresponds to one or more processors 36 for performing server 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to server 16. For example, processing circuitry 34 of server 16 may include composite unit 27 configured to perform one or more server 16 functions described herein such as with respect to multi-audio tracks in a premises security system.

System 10 further includes premises device 14 already referred to. Premises device 14 may have hardware 42 that may include a communication interface 44 that is configured to set up and maintain a wired and/or wireless connection 32 with server 16, network 20, remote monitoring center 18, remote device 22, etc. Communication interface 44 may include, for example, one or more RF transmitters, one or more RF receivers, and/or one or more RF transceivers.

The hardware 42 of premises device 14 further includes microphone 23 and speaker 24, which are configured to perform one or more functions (e.g., audio recording and playback) described herein.

The hardware 42 of premises device 14 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, premises device 14 may further comprise software 52, which is stored in, for example, memory 50 at premises device 14, or stored in external memory (e.g., database, storage array, network storage device, etc.) accessible by premises device 14. The software 52 may be executable by the processing circuitry 46. The software 52 may include a client application 58. The client application 58 may be operable to provide a service to a human or non-human user via premises device 14, such as a communication service that uses track unit 26.

The processing circuitry 46 may be configured to control any of the methods and/or processes described herein and/or to cause such methods, and/or processes to be performed, e.g., by premises device 14. The processor 48 corresponds to one or more processors 48 for performing premises device 14 functions described herein. Premises device 14 includes memory 50 that is configured to store data, programmatic software code and/or other information described herein. In some embodiments, the software 52 and/or the client application 58 may include instructions that, when executed by the processor 48 and/or processing circuitry 46, causes the processor 48 and/or processing circuitry 46 to perform the processes described herein with respect to premises device 14. For example, the processing circuitry 46 of premises device 14 may include a track unit 26 configured to perform one or more audio track based functions described herein such as with respect to multi-track audio in a premises security system.

Further, remote device 22 may include similar and/or corresponding hardware and/or software as described above with respect to premises device 14 such that remote device includes track unit 26 configured to perform one or more audio track based functions described herein such as with respect to multi-track audio in a premises security system. Further, remote device 22 may be configured such that a user of remote device 22 can use client application 58 (e.g., mobile application) to dial into or connect to premises device 14 on a separate channel.

Further, remote device 22 includes microphone 23 and speaker 24, which are configured to perform one or more functions (e.g., audio recording and playback) described herein.

Figure 2:
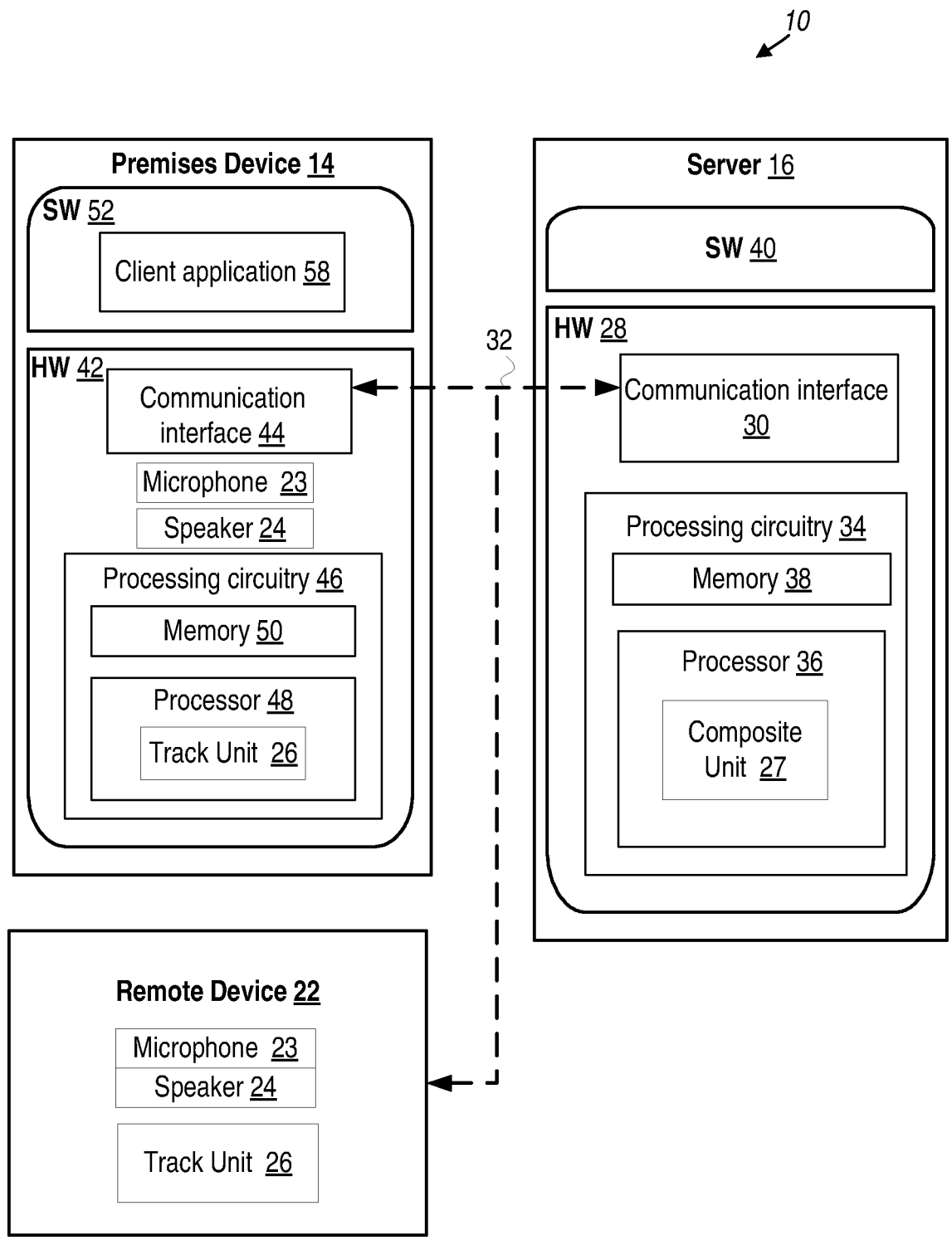
FIG. 2 is a block diagram of a portion of the system according to some embodiments of the present invention.

In some embodiments, the inner workings of the premises device 14, server 16 and remote device 22 may be as shown in FIG. 2 and independently, the surrounding system topology may be that of FIG. 1.

Although FIGS. 1 and 2 show various "units" such as composite unit 27 and track unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
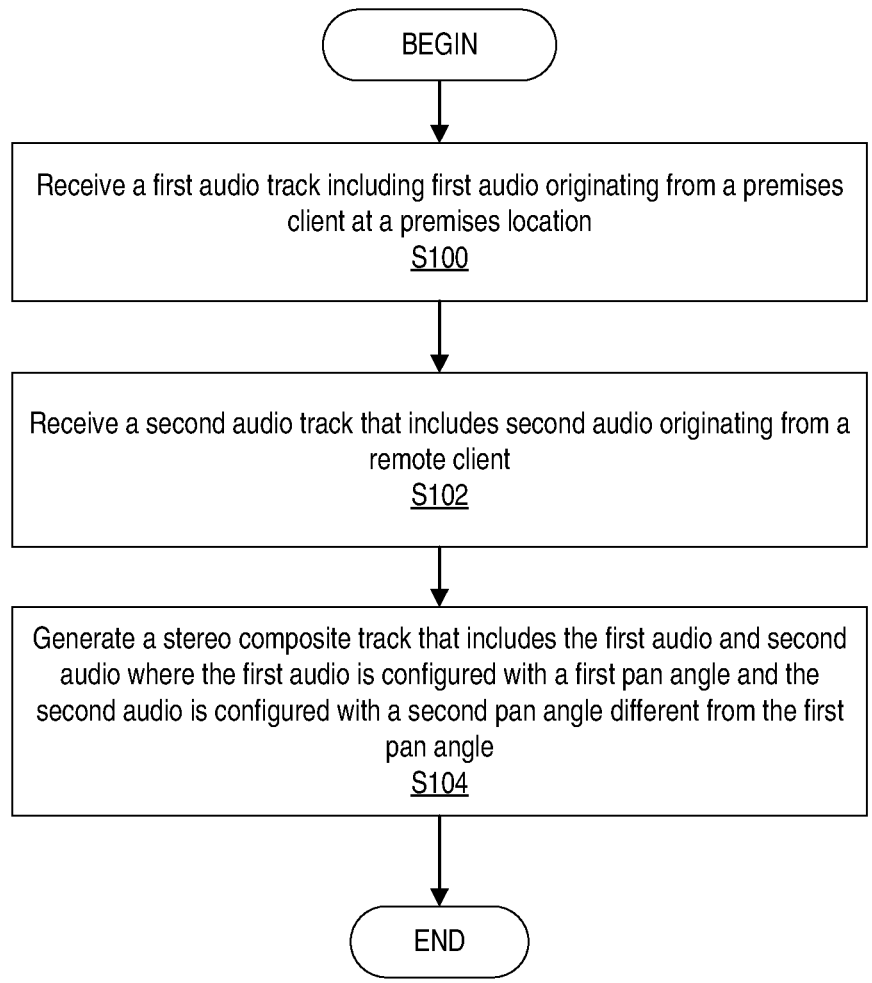
FIG. 3 is a flowchart of an example process in a server according to some embodiments of the present invention.

FIG. 3 is a flowchart of an example process in server 16 according to some embodiments of the present invention. One or more blocks described herein may be performed by one or more elements of server 16 such as by one or more of processing circuitry 34 (including the composite unit 27), processor 36 and/or communication interface 30. Server 16 is configured to receive (Block S100) a first audio track including first audio originating from a premises client at a premises location, as described herein. Server 16 is configured to receive (Block S102) a second audio track including second audio originating from a remote client, as described herein. Server 16 is configured to generate (Block S104) a stereo composite track including the first audio and second audio where the first audio is configured with a first pan angle and the second audio is configured with a second pan angle different from the first pan angle, as described herein.

According to one or more embodiments, the processing circuitry 34 is further configured to generate a respective forensic audio track for the first audio track and the second audio track where each forensic file includes metadata associated with the respective client (e.g., client application 58). In one or more embodiments, the forensic track may remain unmodified. According to one or more embodiments, the first audio track is associated with a premises camera including a microphone 23 and speaker 24, and the second audio track is associated with a mobile device. According to one or more embodiments, the first pan angle associated with the first audio track is equal to a center pan angle.

According to one or more embodiments, the processing circuitry 34 is further configured to receive a plurality of audio tracks including a plurality of audio originating from a plurality of remote clients, where the plurality of audio tracks includes the second audio track, as described herein. The generated stereo composite track includes the plurality of audio tracks where each of the plurality of audio tracks is configured with a different pan angle from each other, as described herein. According to one or more embodiments, the pan angles for the plurality of audio tracks correspond to an interval that is based at least on a total quantity of clients. According to one or more embodiments, the processing circuitry 34 is configured to modify a pan angle for at least one of the plurality of audio tracks based at least an addition or removal of a client from the stereo composite track. According to one or more embodiments, the processing circuitry 34 is configured to maintain pan angles for a remaining plurality of audio tracks in response to the removal of a client from the stereo composite track. According to one or more embodiments, the processing circuitry 34 is further configured to cause transmission of the stereo composite track for playback.

In one or more embodiments, one or more blocks in FIG. 3 may be performed by one or more other entities in system 10, such as by a device in premises security system 12, remote device 22, one or more servers 16 or computing devices in a cloud network, etc.

Figure 4:
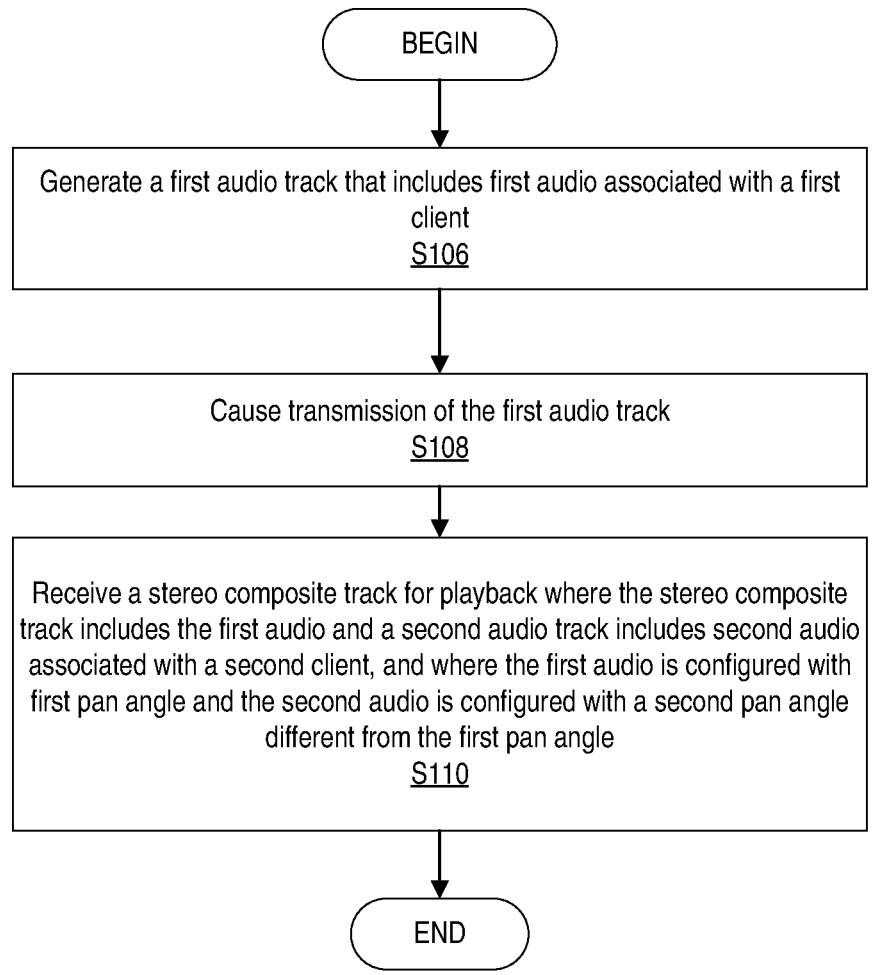
FIG. 4 is a flowchart of an example process in a device (e.g., a premises device and/or a remote device) according to some embodiments of the present invention.

FIG. 4 is a flowchart of an example process in a device (e.g., premises device 14 or remote device 22) according to some embodiments of the present invention. One or more blocks described herein may be performed by one or more elements of premises device 14 or remote device 22 such as by one or more of processing circuitry 46 (including the track unit 26), processor 48, memory 50, microphone 23, speaker 24, and/or communication interface 44. Premises device 14/remote device 22 is configured to generate (Block S106) a first audio track including first audio associated with a first client, as described herein. Further, in some embodiments, a video track corresponding to the audio track is also generated. Premises device 14/remote device 22 is configured to cause (Block S108) transmission of the first audio track, as described herein. In some embodiments, both the video track and first audio track are transmitted. Premises device 14/remote device 22 is configured to receive (Block S110) a stereo composite track for playback where the stereo composite track includes the first audio and a second audio track including second audio associated with a second client, and where the first audio is configured with first pan angle and the second audio is configured with a second pan angle different from the first pan angle, as described herein. In one or more embodiments, the audio from the stereo composite track may be separated for playback such as to playback a subset of the multi-track audio track that is received.

According to one or more embodiments, the first client is a premises client at a premises location and the second client is a remote client, as described herein. According to one or more embodiments, the premises device 14/remote device 22 is a premises camera including a microphone 23 and speaker 24, and the second audio track is associated with a mobile device, as described herein. According to one or more embodiments, the first pan angle associated with the first audio track is equal to a center pan angle, as described herein.

According to one or more embodiments, the stereo composite track includes a plurality of audio tracks including a plurality of audio originating from a plurality of remote clients where the plurality of audio tracks includes the second audio track, and each of the plurality of audio tracks is configured with a different pan angle from each other, as described herein. According to one or more embodiments, the pan angles for the plurality of audio tracks corresponds to an interval that is based at least on a total quantity of clients, as described herein. According to one or more embodiments, the first client is a remote client and the second client is a premises client (e.g., client application 58) at a premises location, as described herein.

Figure 5:
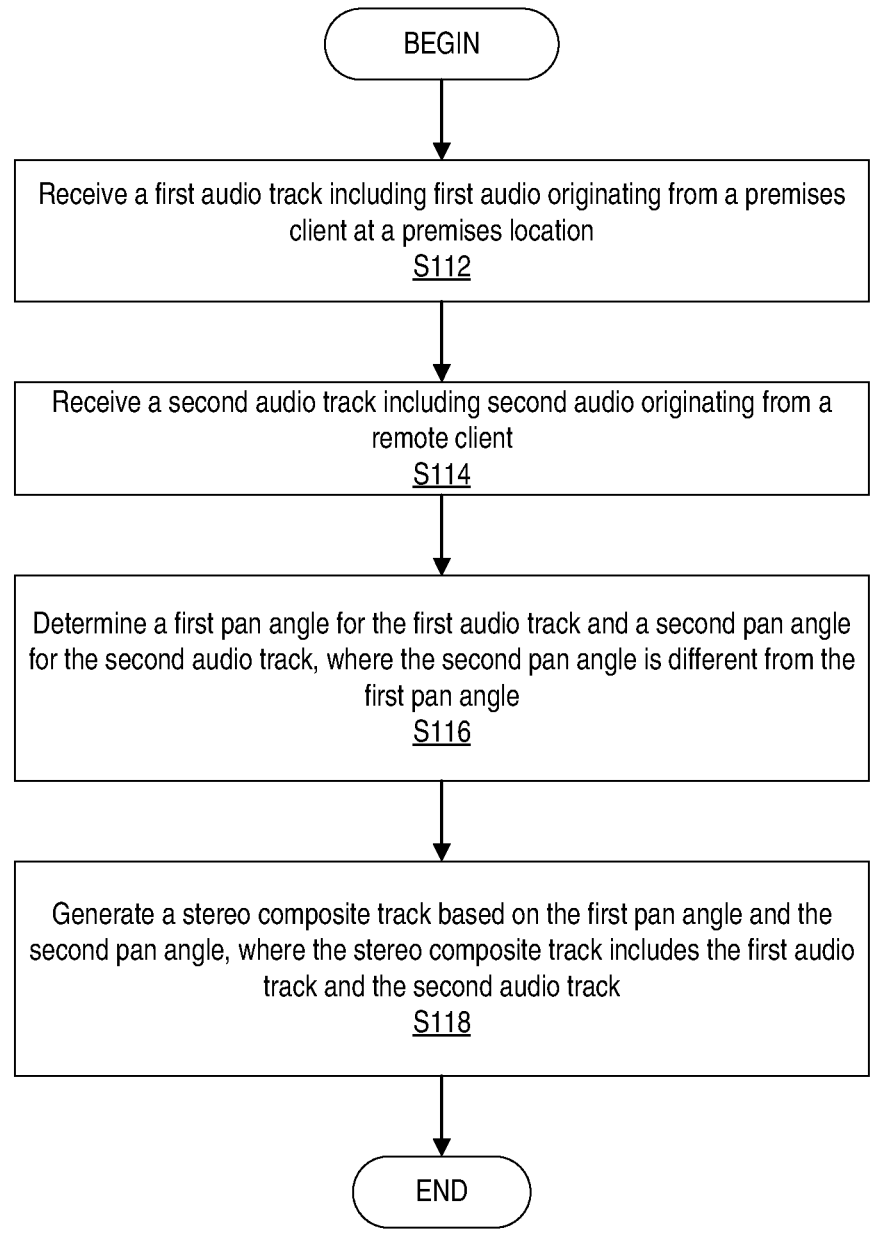
FIG. 5 is a flowchart of another example process in a server according to some embodiments of the present invention.

FIG. 5 is a flowchart of another example process in server 16 according to some embodiments of the present invention. One or more blocks described herein may be performed by one or more elements of server 16 such as by one or more of processing circuitry 34 (including the composite unit 27), processor 36 and/or communication interface 30. Server 16 is configured to receive (Block S112) a first audio track including first audio originating from a premises client (e.g., premises device 14 or remote device 22) at a premises location. The server 16 is further configured to receive (Block S114) a second audio track including second audio originating from a remote client. The server 16 is further configured to determine (Block S116) a first pan angle for the first audio track and a second pan angle for the second audio track, where the second pan angle is different from the first pan angle. The server 16 is further configured to generate (Block S118) a stereo composite track based on the first pan angle and the second pan angle, where the stereo composite track includes the first audio track and the second audio track.

Figure 6:
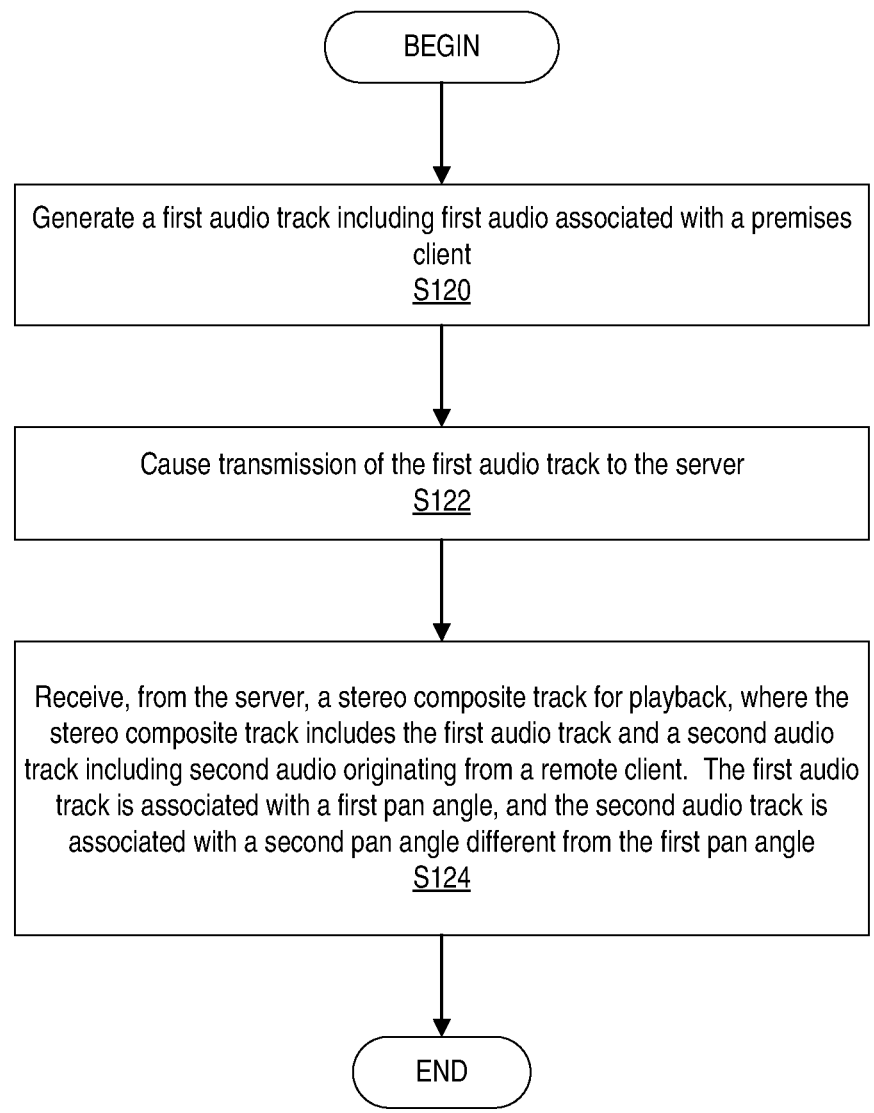
FIG. 6 is a flowchart of another example process in a device (e.g., a premises device and/or a remote device) according to some embodiments of the present invention.

According to one or more embodiments, the generating of the stereo composite track includes generating at least one of a first forensic audio file associated with the first audio track including metadata associated with the premises client and a second forensic audio file associated with the second audio track including metadata associated with the remote client. According to one or more embodiments, the server 16 is further configured to receive a plurality of audio tracks including a plurality of audio originating from a plurality of remote clients, where the plurality of audio tracks includes the second audio track. The server 16 is further configured to determine, for each of the plurality of audio tracks, a respective pan angle, where each respective pan angle is distinct from the other respective pan angles. The generating of the stereo composite track is further based on the respective pan angles, and the stereo composite track includes the plurality of audio tracks. According to one or more embodiments, the determining of the respective pan angles includes determining, for each respective pan angle, a corresponding interval based on a quantity of clients associated with the plurality of audio tracks of the generated stereo composite track. According to one or more embodiments, the server 16 is further configured to remove an audio track from the stereo composite track, where the removed audio track is associated with a removed client. The server 16 is further configured to either modify at least one respective pan angle in response to the removing, or to maintain the respective pan angles in response to the removing. According to one or more embodiments of this aspect, the server 16 is further configured to add an audio track to the stereo composite track, where the added audio track is associated with an added client, and either to modify at least one respective pan angle in response to the adding or to maintain the respective pan angles in response to the adding FIG. 6 is a flowchart of another example process in a device (e.g., premises device 14 or remote device 22) according to some embodiments of the present invention. One or more blocks described herein may be performed by one or more elements of premises device 14 or remote device 22 such as by one or more of processing circuitry 46 (including the track unit 26), processor 48, memory 50, microphone 23, speaker 24, and/or communication interface 44. Premises device 14/remote device 22 is configured to generate (Block S120) a first audio track including first audio associated with a premises client. The premises device 14/remote device 22 is further configured to cause transmission (Block S122) of the first audio track to the server 16. The premises device 14/remote device 22 is further configured to receive (Block S124), from the server 16, a stereo composite track for playback, where the stereo composite track includes the first audio track and a second audio track including second audio originating from a remote client. The first audio track is associated with a first pan angle, and the second audio track is associated with a second pan angle different from the first pan angle.

According to one or more embodiments, the stereo composite track further includes at least one of a first forensic audio file associated with the first audio track including metadata associated with the premises client and a second forensic audio associated with the second audio track including metadata associated with the remote client. According to one or more embodiments, the stereo composite track further includes a plurality of audio tracks including a plurality of audio originating from a plurality of remote clients, where each of the plurality of audio tracks is associated with a respective pan angle, and each respective pan angle is distinct from the other respective pan angles. The plurality of audio tracks includes the second audio track. According to one or more embodiments, each respective pan angle corresponds to an interval that is determined based on a total quantity of clients associated with the generated stereo composite track.

For example, two remote devices 22a and 22b, in remote locations concurrently access the audio and video streams of a premises device 14c, in a real-time streaming session. Remote device 22a receives an audio mix of remote device 22b and premises device 14c. Remote device 22b receives an audio mix of remote device 22a and premises device 14c. Premises device 14c receives an audio mix of remote device 22a and remote device 22b. The connections among the participants may be established through server 16 such that participants connect to server 16 instead of connecting directly to each other. Server 16 routes the audio and video data among remote device 22a, remote device 22b, and premises device 14c. Additionally, server 16 records the audio and video streams into a file to be stored in the cloud network for later review. The file includes a video track, a stereo composite audio track containing a mix of audio from each participant panned to a distinct location (e.g., remote device 22a panned left, premises device 14c panned center, remote device 22b panned right), and for each participant an additional audio track ("forensic track") containing only the audio contribution of that participant may be generated. Associated with each track may be metadata (e.g., IP address, MAC address, pan angle, etc.) corresponding to each contributor to the track.

Having described the general process flow of arrangements of the invention and having provided examples of hardware and software arrangements for implementing the processes and functions of the invention, the sections below provide details and examples of arrangements for multi-track audio in a premises security system.

Some embodiments provide for creating a stereo composite track in which each source is panned automatically to a distinct location to enhance the differentiation of sources on playback. Further, in one or more embodiments, a separate "forensic" audio track is created for at least one individual source. The creation of the stereo composite track and/or forensic audio track may be in addition to the audio track including a mix of all sources.

In one or more embodiments, a forensic audio track containing audio originating from a single client is created. The forensic audio track may be useful for later review of the audio track by a central monitoring center and/or user.

By using digital multimedia container such as those described in MPEG-4 Part 14, metadata identifying the client (e.g., one or more of by IP address, MAC address, session token, etc.) may be associated with the track. That is, each forensic track may include metadata including, for example, an IP address for the respective client that generated the audio. In one or more embodiments, other types of tracks may include metadata including, for example, an IP address for the respective client that generated the audio.

In one or more embodiments, when generating the stereo composite track, stereo panning is achieved by forming a pair of weighted sums of the one or more channels of an audio source to produce a two-channel mix in which the audio source is mapped to a position in the stereo field. That is, mixing of unprocessed sources is performed by weighted sum. However, in one or more other embodiments, each source is processed prior to creating the sum and/or the processing can be applied to the stereo track itself. Such processing may include audio effects such as equalization, dynamic range compression, noise reduction, etc.

Of course, it is understood that implementations creating the two-channel, position-based, audio are not limited to the weighted sum method, and other arrangements are possible. A plurality of two-channel mixes originating from a plurality of clients can be summed to produce a stereo mix. For example, each two-channel mix associated with an audio source can be mapping to a respective position in the stereo field, thereby help improve isolation of audio during playback. Metadata identifying each client and its pan position may be associated with a track containing such a mix.

In one or more embodiments, a mono source x (e.g., premises device 14 or remote device 22) associated with a client (e.g., client application 58) at a location is mapped to a stereo result $\{yL, yR\}$ as follows:

$$alpha = 45° + theta/2$$

$$wL = \cos(alpha)$$

$$wR = \sin(alpha)$$

$$yL = x*wL$$

$$yR = x*wR,$$

where $-90° \leq theta \leq 90°$ is the desired pan angle in degrees in which $-90°$ corresponds to left, $0°$ corresponds to center, and $+90°$ corresponds to right, and wL and wR are the left and right panning coefficients.

In one or more embodiments, the camera track is panned center (0 degrees), and each remote client is assigned a fixed pan position: the first remote is panned $-P$ degrees from center, and the second remote is panned $+P$ degrees from center; additional clients are panned according to:

$$m = \text{floor}((i-1)/2) + 1$$

if $m == 1$ $$D = 1$$

$$N = 0$$

else $$k = \text{floor}(\log 2(m-1))$$

$$D = 2^{\wedge}(k+1)$$

$$N = 2*m - D - 1$$

$$theta[i] = P*(-1\wedge i)*(1 - N/D)$$

where theta[i] is the pan position in degrees of remote client $i \geq 1$, and $0° \leq P \leq 90°$ is the absolute maximum desired pan position.

For example, in the case of five clients and P=45 degrees, the following pan positions result:

$$theta[1] = -45°$$

$$theta[2] = 45°$$

$$theta[3] = -22.5°$$

$$theta[4] = 22.5°$$

$$theta[5] = -33.75°$$

In another embodiment, the camera track is panned center, and each remote client is panned according to an interval that is based at least on a total number/quantity of remote clients, such that there is an equal spacing of pan positions:

$$theta[i] = P*(-1\wedge i)*(1 - \text{floor}((i-1)/2)/\text{floor}((n+1)/2)),$$

where theta, P, and i are as before, and n is the total number of remote clients.

For example, in the case of five clients and P=45 degrees, $$theta[1] = -45°$$

$$theta[2] = 45°$$

$$theta[3] = -30°$$

$$theta[4] = 30°$$

$$theta[5] = -15°$$

In the case of seven clients and P=45 degrees, the following pan positions result:

$$theta[1] = -45°$$

$$theta[2] = 45°$$

$$theta[3] = -33.75°$$

$$theta[4] = 33.75°$$

$$theta[5] = -22.5°$$

$$theta[6] = 22.5°$$

$$theta[7] = -11.25°$$

In one or more embodiments of this example, as clients are added or removed, pan positions may shift. In one or more embodiments, while a pan position is being updated, interpolation using a time constant of at least approximately 20 ms may be used such as to help avoid noise, e.g., "zipper noise."

In one or more embodiments, if one or more clients are removed (e.g., in the case of a disconnect), the remaining clients maintain their pan positions. Further, in one or more embodiments, the remaining clients may maintain their pan positions and only shift in pan position as necessary to accommodate additional clients.

Some Examples

Example A1. A server 16 comprising: processing circuitry configured to: receive a first audio track including first audio originating from a premises client at a premises location; receive a second audio track including second audio originating from a remote client; and generate a stereo composite track including the first audio and second audio, the first audio being configured with a first pan angle and the second audio being configured with a second pan angle different from the first pan angle.

Example A2. The server 16 of Example A1, wherein the processing circuitry is further configured to generate a respective forensic audio track for the first audio track and the second audio track, each forensic file including metadata associated with the respective client.

Example A3. The server 16 of Example A1, wherein the first audio track is associated with a premises camera including a microphone 23 and speaker 24; and the second audio track is associated with a mobile device.

Example A4. The server 16 of any one of Examples A1-A3, wherein the first pan angle associated with the first audio track is equal to a center pan angle.

Example A5. The server 16 of Example A4, wherein the processing circuitry is further configured to receive a plurality of audio tracks including a plurality of audio originating from a plurality of remote clients, the plurality of audio tracks including the second audio track; and the generated stereo composite track including the plurality of audio tracks, each of the plurality of audio tracks being configured with a different pan angle from each other.

Example A6. The server 16 of Example A5, wherein the pan angles for the plurality of audio tracks correspond to an interval that is based at least on a total quantity of clients.

Example A7. The server 16 of any one of Examples A5-A6, wherein the processing circuitry is configured to modify a pan angle for at least one of the plurality of audio tracks based at least an addition or removal of a client from the stereo composite track.

Example A8. The server 16 of any one of Examples A5-A6, wherein the processing circuitry is configured to maintain pan angles for a remaining plurality of audio tracks in response to the removal of a client from the stereo composite track.

Example A9. The server 16 of any one of Examples A1-A8, wherein the processing circuitry is further configured to cause transmission of the stereo composite track for playback.

Example B1. A method comprising: receiving a first audio track including first audio originating from a premises client at a premises location; receiving a second audio track including second audio originating from a remote client; and generating a stereo composite track including the first audio and second audio, the first audio being configured with a first pan angle and the second audio being configured with a second pan angle different from the first pan angle.

Example B2. The method of Example B 1, further comprising generating a respective forensic audio track for the first audio track and the second audio track, each forensic file including metadata associated with the respective client.

Example B3. The method of Example B 1, wherein the first audio track is associated with a premises camera including a microphone 23 and speaker 24; and the second audio track is associated with a mobile device.

Example B4. The method of any one of Examples B1-B3, wherein the first pan angle associated with the first audio track is equal to a center pan angle.

Example B5. The method of Example B4, further comprising receiving a plurality of audio tracks including a plurality of audio originating from a plurality of remote clients, the plurality of audio tracks including the second audio track; and the generated stereo composite track including the plurality of audio tracks, each of the plurality of audio tracks being configured with a different pan angle from each other.

Example B6. The method of Example B5, wherein the pan angles for the plurality of audio tracks correspond to an interval that is based at least on a total quantity of clients.

Example B7. The method of any one of Examples B5-B6, further comprising modifying a pan angle for at least one of the plurality of audio tracks based at least an addition or removal of a client from the stereo composite track.

Example B8. The method of any one of Examples B5-B6, further comprising maintaining pan angles for a remaining plurality of audio tracks in response to the removal of a client from the stereo composite track.

Example B9. The method of any one of Examples B1-B8, further comprising causing transmission of the stereo composite track for playback.

Example C1. A device comprising: processing circuitry configured to: generate a first audio track including first audio associated with a first client; cause transmission of the first audio track; and receive a stereo composite track for playback, the stereo composite track including the first audio and a second audio track including second audio associated with a second client, the first audio being configured with first pan angle and the second audio being configured with a second pan angle different from the first pan angle.

Example C2. The device of Example C 1, wherein the first client is a premises client at a premises location and the second client is a remote client.

Example C3. The device of Example C1-C2, wherein the device is a premises camera including a microphone 23 and speaker 24; and the second audio track is associated with a mobile device.

Example C4. The device of any one of Examples C1-C3, wherein the first pan angle associated with the first audio track is equal to a center pan angle.

Example C5. The device of Example C4, wherein the stereo composite track includes a plurality of audio tracks including a plurality of audio originating from a plurality of remote clients, the plurality of audio tracks including the second audio track, each of the plurality of audio tracks being configured with a different pan angle from each other.

Example C6. The device of Example C5, wherein the pan angles for the plurality of audio tracks corresponds to an interval that is based at least on a total quantity of clients.

Example C7. The device of Example C 1, wherein the first client is a remote client and the second client is a premises client at a premises location.

Example D1. A method comprising: generating a first audio track including first audio associated with a first client; causing transmission of the first audio track; and receiving a stereo composite track for playback, the stereo composite track including the first audio and a second audio track including second audio associated with a second client, the first audio being configured with first pan angle and the second audio being configured with a second pan angle different from the first pan angle.

Example D2. The method of Example D1, wherein the first client is a premises client at a premises location and the second client is a remote client.

Example D3. The method of Example D1-D2, wherein the method is implemented by a premises camera including a microphone 23 and speaker 24; and the second audio track is associated with a mobile device.

Example D4. The method of any one of Examples D1-D3, wherein the first pan angle associated with the first audio track is equal to a center pan angle.

Example D5. The method of Example D4, wherein the stereo composite track includes a plurality of audio tracks including a plurality of audio originating from a plurality of remote clients, the plurality of audio tracks including the second audio track, each of the plurality of audio tracks being configured with a different pan angle from each other.

Example D6. The method of Example D5, wherein the pan angles for the plurality of audio tracks corresponds to an interval that is based at least on a total quantity of clients.

Example D7. The method of Example D1, wherein the first client is a remote client and the second client is a premises client at a premises location.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the invention may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A server comprising:
processing circuitry configured to:
receive a first audio track comprising first audio;
receive a second audio track comprising second audio originating from a remote client;
determine the first audio originates from a premises camera of a monitoring system for monitoring a premises location;
in response to the determination that the first audio originates from the premises camera of the monitoring system, determine a first predefined pan angle for the first audio track;
determine a second pan angle for the second audio track, the second pan angle being determined based on a quantity of remote clients and the first predefined pan angle, the second pan angle being different from the first predefined pan angle;
generate a recording of a stereo composite track, the stereo composite track comprising the first audio track panned to the first predefined pan angle and the second audio track panned to the second pan angle to isolate the first audio originating from the premises camera of the monitoring system from the second audio originating from the remote client; and transmit the recording to the premises camera of the monitoring system and the remote client for playback.

2. The server of claim 1, wherein the generating of the recording of the stereo composite track comprises generating at least one of:
a first forensic audio file associated with the first audio track comprising metadata associated with the premises camera; and
a second forensic audio file associated with the second audio track comprising metadata associated with the remote client.

3. The server of claim 1, wherein:
the processing circuitry is further configured to:
receive a plurality of audio tracks comprising a plurality of audio originating from a plurality of remote clients, the plurality of audio tracks comprising the second audio track;
determine, for each of the plurality of audio tracks, a respective pan angle, each respective pan angle being distinct from the other respective pan angles; and
the generating of the recording of the stereo composite track being further based on the respective pan angles, the stereo composite track further comprising the plurality of audio tracks.

4. The server of claim 3, wherein the determining of the respective pan angles comprises determining, for each respective pan angle, a corresponding pan angle interval based on a quantity of clients associated with the plurality of audio tracks of the stereo composite track.

5. The server of claim 4, wherein the processing circuitry is further configured to:
remove an audio track from the stereo composite track, the removed audio track being associated with a removed client; and
one of:
modify at least one respective pan angle in response to the removing; and
maintain the respective pan angles in response to the removing.

6. The server of claim 4, wherein the processing circuitry is further configured to:
add an audio track to the stereo composite track, the added audio track being associated with an added client; and
one of:
modify at least one respective pan angle in response to the adding; and
maintain the respective pan angles in response to the adding.

7. A method implemented in a server, the method comprising:
receiving a first audio track comprising first audio;
receiving a second audio track comprising second audio originating from a remote client;
determining the first audio originates from a premises camera of a monitoring system for monitoring a premises location;
in response to the determination that the first audio track originates from the premises camera of the monitoring system, determining a first predefined pan angle for the first audio track;
determining a second pan angle for the second audio track, the second pan angle being determined based on a quantity of remote clients and the first pan angle, the second pan angle being different from the first predefined pan angle;
generating a recording of a stereo composite track, the stereo composite track comprising the first audio track panned to the first predefined pan angle and the second audio track panned to the second pan angle to isolate the first audio originating from the premises camera of the monitoring system from the second audio originating from the remote client; and
transmitting the recording to the premises camera of the monitoring system and the remote client for playback.

8. The method of claim 7, wherein the generating of the recording of the stereo composite track comprises generating at least one of:
a first forensic audio file associated with the first audio track comprising metadata associated with the premises camera; and
a second forensic audio file associated with the second audio track comprising metadata associated with the remote client.

9. The method of claim 7, further comprising:
receiving a plurality of audio tracks comprising a plurality of audio originating from a plurality of remote clients, the plurality of audio tracks comprising the second audio track;
determining, for each of the plurality of audio tracks, a respective pan angle, each respective pan angle being distinct from the other respective pan angles; and
the generating of the recording of the stereo composite track being further based on the respective pan angles, the stereo composite track further comprising the plurality of audio tracks.

10. The method of claim 9, wherein the determining of the respective pan angles comprises determining, for each respective pan angle, a corresponding pan angle interval based on a quantity of clients associated with the plurality of audio tracks of the stereo composite track.

11. The method of claim 10, further comprising:
removing an audio track from the stereo composite track, the removed audio track being associated with a removed client; and
one of:
modifying at least one respective pan angle in response to the removing; and
maintaining the respective pan angles in response to the removing.

12. The method of claim 10, further comprising:
adding an audio track to the stereo composite track, the added audio track being associated with an added client; and
one of:
modifying at least one respective pan angle in response to the adding; and
maintaining the respective pan angles in response to the adding.

13. A device of a monitoring system, the device being in communication with a server, the device comprising:
a premises camera for monitoring a premises location; and
processing circuitry configured to:
generate a first audio track comprising first audio associated with the premises camera;
cause transmission of the first audio track to the server; and
receive, from the server, a recording comprising a stereo composite track for playback, the stereo composite track comprising:
the first audio track panned to a first predefined pan angle, the first predefined pan angle having been determined for the first audio track based on the first audio track originating from the premises camera; and a second audio track comprising second audio originating from a remote client and panned to a second pan angle, the second pan angle having been determined for the second audio track based on a quantity of remote clients and the first pan angle, the second pan angle being different from the first pan angle to isolate the first audio track from the premises camera of the monitoring system from the second audio track from the remote client.

14. The device of claim 13, wherein the stereo composite track further comprises a first forensic audio file associated with the first audio track comprising metadata associated with the premises camera.

15. The device of claim 14, wherein the stereo composite track further comprises a second forensic audio file associated with the second audio track comprising metadata associated with the remote client.

16. The device of claim 13, wherein the stereo composite track further comprises a plurality of audio tracks comprising a plurality of audio originating from a plurality of remote clients, each of the plurality of audio tracks being associated with a respective pan angle.

17. The device of claim 16, wherein each respective pan angle being distinct from the other respective pan angles, the plurality of audio tracks comprising the second audio track.

18. The device of claim 17, wherein each respective pan angle corresponds to an interval that is determined based on a total quantity of clients associated with the stereo composite track.

19. The device of claim 13, wherein each respective pan angle corresponds to an interval that is determined based on a total quantity of clients associated with the stereo composite track.

20. The device of claim 13, wherein the stereo composite track further comprises:

a first forensic audio file associated with the first audio track comprising metadata associated with the premises camera; and a second forensic audio file associated with the second audio track comprising metadata associated with the remote client.

\* \* \* \* \*